2,755,212

SHEET GLASS

Wilbur F. Brown, Toledo, Ohio, assignor to Libbey-Owens-Ford Glass Company, Toledo, Ohio, a corporation of Ohio No Drawing. Application August 4, 1952,
Serial No. 302,613

3 Claims. (Cl. 154—2.77)

The present invention relates broadly to flat drawn sheet glass, and more particularly to a special glass of this general character which has an unusually attractive color and improved absorption and transmission characteristics.

An important object of the invention is the provision of flat drawn sheet glass having glare-reducing properties and that is especially suitable for glazing such critical viewing areas as automobile windows and/or windshields.

Another object is to provide a glass of the above character with a distinctive blue-green color that is both pleasing and restful to the eye.

Another object is the provision of a glass of this kind that has the property of absorbing light rays at both the ultra-violet and infra-red ends of the spectrum, but which, at the same time, has a transmissivity for visible light that conforms to the high standards set up by motor vehicle codes for visibility.

Still another object is to provide an article of laminated flat drawn sheet glass which has optical properties suitable for automotive glazing, and which gives the maximum possible light transmission for clear vision at all ranges of light conditions from bright sun to darkness of night while also reducing the input of the heat and glare rays from both the sun and from artificial lights.

In manufacturing special glasses that require relatively close control of the batch formula ingredients or ultimate analytical composition, the usual procedure is to form the melt in pots. This necessarily limits production because the process is not continuous and the quantities which can be handled in each melt are comparatively small.

According to the present invention, however, there is provided a special glass of closely controlled quality and physical properties that is nevertheless particularly adapted for continuous production in large quantities with conventional sheet glass melting and drawing machinery.

Thus, the special glare-reducing glass of the invention may be produced according to conventional procedures for drawing sheet glass in the flat by charging into the melting tank a glass batch including the following ingredients in substantially the proportions indicated:

| | |
|---|---|
| Sand | 1000 |
| Burnt dolomitic limestone | 116 |
| Burnt calcium limestone | 50 |
| Soda ash | 286 |
| Salt cake | 44 |
| Aplite | 55 |
| Carbon | 1.32 |
| Rouge | 6.28 |
| Cobalt oxide | .0114 |
| Cullet | 800 |

It will be noted from the above batch that an unusually large amount of iron is employed as compared to the negligible amount usually considered to be permissible in automotive glass. Now iron can be present in glass in two different states; namely, as ferrous oxide (FeO) and as ferric oxide ($Fe_2O_3$). Ferrous oxide imparts a bluish tint to the glass, and glass containing iron in this form will absorb light rays at the infra-red end of the spectrum; while, on the other hand, ferric oxide imparts a yellowish tint to the glass, and glass containing this oxide of iron will absorb light rays at the ultra-violet end of the spectrum.

After considerable research, I have found that I can produce commercially, and control within commercial limits, a glass with a ratio of ferric to ferrous iron that will result in the absorption of both light and heat rays that are undesirable for comfortable vision, without seriously affecting the desired visibility through the glass.

Accordingly, there is included in the batch for the glass of this invention sufficient carbon, or other reducing agent, to reduce enough of the ferric oxide to ferrous oxide to obtain the desired balance between the two.

As pointed out above, the presence of ferrous oxide imparts a bluish color to the glass. In combination with the yellowish tint imparted by ferric oxide this may produce an undesirable green color but, by employing sufficient carbon, the ferric oxide can be reduced to a point where the proportion of ferrous oxide to ferric oxide is high enough to permit the characteristic blue-green color of the glass of this invention to be attained.

In order to supplement and control the coloring action of the ferrous and ferric oxide, and to make possible variations in the proportion of ferrous oxide to ferric oxide that are necessary to poduce the desired balance between the two without affecting the wanted color, cobalt (preferably in the form of cobalt oxide) is also added, in very small amounts as indicated above, to the batch. The cobalt oxide does not affect the state of oxidation of the iron in the glass, and effectively masks the slight shade variations which may occur in the commercial production of glass with a definite aimed-at ratio of ferric to ferrous oxide.

The glare-reducing glass of this invention, produced in the manner and from the ingredients outlined above, will have a calculated analysis substantially as follows:

| | |
|---|---|
| $SiO_2$ | 72.92 |
| $Fe_2O_3$ | .51 |
| $Al_2O_3$ | 1.05 |
| $TiO_2$ | .02 |
| CaO | 8.44 |
| MgO | 3.46 |
| $Na_2O$ | 13.21 |
| $K_2O$ | .10 |
| $So_3$ | .29 |
| $Co_3O_4$ | .0008 |

During tests with this new glare-reducing glass, two sheets of it in thicknesses of approximately 7/64 of an inch were laminated together with a .015" thick vinyl plastic interlayer and used as automobile glazings. Average transmittance values for single sheets and for the laminated sheets were found to be:

*Percent transmittance*

| Glass Thickness in Inches | Ultra-Violet | Illuminant A | Total Radiation |
|---|---|---|---|
| .111 (Single Sheet) | 58 | 82 | 65 |
| .237 (Laminated) | 43 | 73 | 49 |

In addition to its very desirable absorption and transmission characteristics, the soft blue-green tone of this new glare-reducing glass was found to be extremely soothing and restful to the eyes; and when used in automotive glazing was found to noticeably reduce driving strain and fatigue.

It is to be understood that the form of the invention herewith described is to be taken as an illustrative embodiment only of the same, and that various procedural changes may be resorted to without departing from the spirit of the invention or the scope of the subjoined claims.

What is claimed is:

1. In the process of preparing a glare-reducing glass by charging a glass batch to a melting tank, fusing the batch and continuously sheeting glass from the resulting melt, the improvement which comprises charging to the melting tank a glass batch comprising the following ingredients in substantially the proportions shown:

| | |
|---|---:|
| Sand | 1000 |
| Burnt dolomitic limestone | 116 |
| Burnt calcium limestone | 50 |
| Soda ash | 286 |
| Salt cake | 44 |
| Aplite | 55 |
| Carbon | 1.32 |
| Rouge | 6.28 |
| Cobalt oxide | .0114 |
| Cullet | 800 |

2. Glare-reducing drawn sheet glass having a blue-green color and an ultimate analystical composition substantially as follows:

| | |
|---|---:|
| $SiO_2$ | 72.92 |
| $Fe_2O_3$ | .51 |
| $Al_2O_3$ | 1.05 |
| $TiO_2$ | .02 |
| $CaO$ | 8.44 |
| $MgO$ | 3.46 |
| $Na_2O$ | 13.21 |
| $K_2O$ | .10 |
| $So_3$ | .29 |
| $Co_3O_4$ | .0008 |

3. A sheet of laminated safety glass comprising two sheets of blue-green colored flat drawn sheet glass having an ultimate analytical composition substantially as follows:

| | |
|---|---:|
| $SiO_2$ | 72.92 |
| $Fe_2O_3$ | .51 |
| $Al_2O_3$ | 1.05 |
| $TiO_2$ | .02 |
| $CaO$ | 8.44 |
| $MgO$ | 3.46 |
| $Na_2O$ | 13.21 |
| $K_2O$ | .10 |
| $So_3$ | .29 |
| $Co_3O_4$ | .0008 | bonded together with a substantially colorless interlayer of vinyl plastic to produce a composite glare-reducing structure.

References Cited in the file of this patent

UNITED STATES PATENTS

| | | |
|---|---|---|
| 1,936,231 | Gelstharp | Nov. 21, 1933 |
| 2,034,994 | Sharp et al. | Mar. 24, 1936 |
| 2,223,118 | Miller | Nov. 26, 1940 |
| 2,244,468 | Lytle | June 3, 1941 |
| 2,524,719 | Tillyer | Oct. 3, 1950 |
| 2,581,639 | Duncan | Jan. 8, 1952 |
| 2,636,420 | Ryan et al. | Apr. 28, 1953 |

FOREIGN PATENTS

| | | |
|---|---|---|
| 550,782 | Germany | 1932 |